(12) United States Patent
Horimizu

(10) Patent No.: US 8,807,634 B2
(45) Date of Patent: Aug. 19, 2014

(54) COWL-TOP COVER CROSSMEMBER HAVING STEPPED PORTIONS

(75) Inventor: Yasumasa Horimizu, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 181 days.

(21) Appl. No.: 13/298,018

(22) Filed: Nov. 16, 2011

(65) Prior Publication Data

US 2012/0126577 A1 May 24, 2012

(30) Foreign Application Priority Data

Nov. 19, 2010 (JP) .................... 2010-259549

(51) Int. Cl.
*B60R 21/34* (2011.01)
*B62D 25/08* (2006.01)

(52) U.S. Cl.
USPC .................. 296/192; 296/187.04; 296/193.11

(58) Field of Classification Search
CPC .................. B60R 2021/343; B62D 25/081
USPC .................. 180/69.2, 69.21; 188/376, 377; 280/748; 293/133; 296/96.21, 146.6, 296/187.03, 187.04, 190.1, 192, 193.11, 296/201; D12/91
See application file for complete search history.

(56) References Cited

U.S. PATENT DOCUMENTS

| | | | | |
|---|---|---|---|---|
| 4,109,955 A * | 8/1978 | Amann et al. ............... 296/37.1 |
| 4,397,914 A * | 8/1983 | Miura et al. ................... 428/43 |
| 4,679,845 A * | 7/1987 | Detampel et al. ............ 296/192 |
| 4,765,672 A * | 8/1988 | Weaver ........................ 296/84.1 |
| 4,869,546 A * | 9/1989 | Sato ............................... 296/192 |
| 4,976,491 A * | 12/1990 | Hashimoto et al. ........... 296/192 |
| 5,232,261 A * | 8/1993 | Kuroda et al. ............... 296/146.4 |
| 5,431,442 A * | 7/1995 | Tomita et al. ................ 280/752 |
| 5,570,558 A * | 11/1996 | Persson ....................... 296/146.6 |
| 6,082,792 A * | 7/2000 | Evans et al. .................. 293/133 |
| 6,193,304 B1 * | 2/2001 | Takahashi et al. ............ 296/192 |
| 6,213,541 B1 * | 4/2001 | Razgunas et al. ............ 296/192 |
| 6,224,143 B1 * | 5/2001 | Koulchar et al. ............. 296/192 |
| 6,334,638 B1 * | 1/2002 | Yamamuro et al. .......... 293/133 |
| 6,565,148 B1 * | 5/2003 | Teramoto et al. ............ 296/192 |
| 6,669,251 B2 * | 12/2003 | Trappe ......................... 293/120 |
| 6,767,052 B2 * | 7/2004 | Kubota .................... 296/203.02 |
| 6,969,107 B2 * | 11/2005 | Omori et al. ............... 296/146.6 |
| 7,124,541 B2 * | 10/2006 | Fellner ........................... 49/502 |
| 7,140,673 B2 * | 11/2006 | Ito et al. ..................... 296/193.11 |
| 7,150,496 B2 * | 12/2006 | Fujimoto .................. 296/187.04 |
| 7,316,448 B2 * | 1/2008 | Koyama et al. .............. 296/192 |
| 7,341,298 B2 * | 3/2008 | Jones ............................. 296/29 |

(Continued)

FOREIGN PATENT DOCUMENTS

| | | | | |
|---|---|---|---|---|
| EP | 2612802 A2 * | 7/2013 | ............. B62D 25/08 |
| FR | 2933942 A1 * | 1/2010 | ............. B62D 25/08 |

(Continued)

*Primary Examiner* — Glenn Dayoan
*Assistant Examiner* — Paul Chenevert
(74) *Attorney, Agent, or Firm* — Arent Fox LLP

(57) ABSTRACT

A cowl-top cover 10 for covering a vehicle body between a front window shield and a front hood is provided with: a seal portion abutting against a rear end lower part of the front hood; and a longitudinal wall portion 1 that supports the seal portion and that is erected in a vertical direction of a vehicle, wherein the longitudinal wall 1 includes a stepped portion 3 that is extended along the vertical direction, the longitudinal wall being shaped to be wavy in a widthwise direction of the vehicle.

11 Claims, 9 Drawing Sheets

(56) References Cited

U.S. PATENT DOCUMENTS

| | | | |
|---|---|---|---|
| 7,357,446 B2* | 4/2008 | Sakai et al. | 296/192 |
| 7,488,031 B2* | 2/2009 | Ishitobi | 296/193.11 |
| 7,552,964 B2* | 6/2009 | Saito | 296/192 |
| 7,810,877 B2* | 10/2010 | Ishitobi | 296/193.11 |
| 7,997,642 B2* | 8/2011 | Rocheblave et al. | 296/193.11 |
| 8,002,335 B2* | 8/2011 | Usuda | 296/192 |
| 8,186,749 B2* | 5/2012 | Serizawa et al. | 296/192 |
| 8,215,686 B2* | 7/2012 | Czopek et al. | 293/133 |
| 8,398,156 B2* | 3/2013 | Matsuoka | 296/192 |
| 8,403,405 B2* | 3/2013 | Ikeda et al. | 296/193.11 |
| 8,474,901 B2* | 7/2013 | Serizawa et al. | 296/192 |
| 2004/0251716 A1* | 12/2004 | Choi et al. | 296/187.03 |
| 2006/0163915 A1* | 7/2006 | Ikeda et al. | 296/193.11 |
| 2007/0029840 A1* | 2/2007 | Marijnissen et al. | 296/187.03 |
| 2008/0185871 A1* | 8/2008 | Ishiyama et al. | 296/187.04 |
| 2009/0206633 A1* | 8/2009 | Feeser et al. | 296/198 |
| 2011/0068607 A1* | 3/2011 | Ott et al. | 296/192 |
| 2012/0126581 A1* | 5/2012 | Rocheblave et al. | 296/193.11 |
| 2013/0076072 A1* | 3/2013 | Morden et al. | 296/192 |
| 2013/0181484 A1* | 7/2013 | Grattan | 296/193.11 |
| 2013/0221705 A1* | 8/2013 | Sugishima et al. | 296/192 |
| 2013/0320712 A1* | 12/2013 | Murofushi et al. | 296/192 |

FOREIGN PATENT DOCUMENTS

| | | | |
|---|---|---|---|
| JP | 04283171 A * | 10/1992 | B62D 25/08 |
| JP | 05016836 A * | 1/1993 | B62D 25/08 |
| JP | 2007-152991 A | 6/2007 | |
| JP | 2009-45996 A | 3/2009 | |
| WO | WO 2009110255 A1 * | 9/2009 | B62D 25/08 |

* cited by examiner

COWL-TOP COVER CROSSMEMBER HAVING STEPPED PORTIONS

CROSS-REFERENCE TO RELATED APPLICATIONS

This application claims priority of Japanese Patent Application No. 2010-259549, filed on Nov. 19, 2010. The contents of this application are incorporated herein by reference in their entirety.

BACKGROUND OF THE INVENTION

1. Field of the Invention

The present invention relates to a cowl structure for automobile, and in particular, to a cowl-top cover for automobile, which is disposed among a lower end part of a front window panel, a bonnet, and a dash panel, the cowl-top cover absorbing a shock.

2. Description of the Related Art

In general, in a vehicle such as an automobile, an engine room having a motor-driven engine incorporated therein is installed at a front part of a vehicle body; the engine room is structured so as to be covered at left and right side faces with a fender panel at its left and right side faces and to be covered with an openable/closable hood at its upper face opening portion; and a cowl-top cover having an air suction opening for introducing atmospheric air is provided on a cowl-top panel upward of a rear part of the engine room.

As the prior art, there exists a cowl-top cover in which a protrusion portion is formed to extend and protrude in a vehicle widthwise direction by means of: a front wall on which an air suction opening for introducing atmospheric air into a compartment is opened; and a rear wall that is provided to communicate with the front wall, and an end part opening of the protrusion portion is closed to an end plate to thereby constitute a cowl-top cover main body, the cowl-top cover for vehicle, being adapted to provide a separation state portion between the end part opening of the protrusion portion and the end plate to thereby constitute the protrusion portion in a bottom-opening deformable (for example, Japanese Unexamined Patent Application Publication No. 2007-152991). In addition, there exists a cowl structure of four-wheel vehicle, in which a longitudinal wall portion is erected at a main body portion of a cowl-top garnish that is disposed between a front hood and a front glass, a rear end back face of the front hood is received via a hood seal that is attached to the longitudinal wall portion, and a fixing portion formed at a front end of the main body portion of the cowl-top garnish is fixedly bonded with a front-end mount portion of a cowl upper panel, the cowl structure for four-wheel vehicle, the structure being adapted to offset the longitudinal wall portion of the cowl-top garnish rearward of a vehicle body relative to the fixing portion and to form an elongated hole taken along the longitudinal wall portion at the main body portion in the vicinity of the vertical wall portion (for example, refer to Japanese Unexamined Patent Application Publication No. 2009-45996).

In Japanese Unexamined Patent Application Publication No. 2007-152991, which is the prior art, there is disclosure of a cowl-top cover having traceability to form a vehicle body and having an energy absorption structure, in which, in a case where a cowl-top cover main body having a protrusion portion is which provided an extension, in a vehicle widthwise direction, and is formed in a substantial inverted-V shape by means of a front wall, which is opened at an air suction opening for introducing atmospheric air into a compartment, and a rear wall which is provided to communicate with the front wall, is installed upward of a rear part of an engine room, a separation state portion exerted by a slit-shaped gap is provided at a communication portion between an opening at each end part of the protrusion portion and an end plate to thereby cause the protrusion portion to be bottom-opening deformable.

In the prior art, while there is no problem associated with shock absorption exerted by a cowl cover, a side face wall portion of the cowl cover as shock absorption is used as an independent soft material, thus resulting in an increase in parts costs. In addition, since such an independent material, more mounting works and processes have to be done. Further, there arise several problems in manufacture of cowl covers, such as a problem that parts have alignment portions, thus making it difficult to manage quality or a problem that an engagement structure is set at the time of making dies, and thus there is a need to set a slide structure in die, for example.

The cowl cover of Japanese Unexamined Patent Application Publication No. 2009-45996 employs a stress concentration structure in a longitudinal direction. Thus, an energy absorption in a downward direction (vertical direction) can only be achieved. Therefore, since the rigidity in the longitudinal direction increases in the stress concentration structure, an energy absorption in a transverse direction is not achieved, and an energy absorption in a wide range has to be achieved.

However, since an external energy at the time of shock is locally input and then propagates in a radial shape, the energy can be absorbed in only one vertical direction, leading to an impaired efficiency.

Accordingly, it is an object of the present invention to provide a cowl-top cover leading to an efficient absorption of impact energy and a cost reduction, which are the above-described problems which still remain unsolved.

SUMMARY OF THE INVENTION

A first aspect invention of the present invention, which is capable of solving the problems describe above, is directed to a cowl-top cover as set forth in claim 1, and is as follows.

A cowl-top cover for covering a vehicle body between a front window shield and a front hood, the cowl-top cover comprising:
  a seal portion that abuts against a rear end lower part of the front hood; and
  a longitudinal wall portion that supports a seal portion, and is erected in a vertical direction of a vehicle,
  wherein the longitudinal wall has a stepped portion that is extended along the vertical direction, the longitudinal wall being formed to be curved in a widthwise direction of the vehicle.

A second aspect of the present invention, which is capable of solving the problems described above, is directed to a cowl-top cover, In addition to the invention set forth above, the longitudinal wall is configured so that a portion that is formed in a forward/backward direction of the wall portion shaped to be wavy is smaller in thickness than adjacent another portion.

A third aspect of the present invention, which is capable of solving the problems described above, is directed to a cowl-top cover. In addition to the invention set forth above, the longitudinal wall is weighted on a rear end part of a front hood, and is configured to be inclined relative to a lowering direction.

The cowl-top cover according to the present invention has the configuration as described above; and therefore, there are attained advantageous effects described below.

(1) Efficient energy absorption can be achieved in a radiation manner in accordance with an input position of energy.

(2) An energy absorption structure in a longitudinal direction is provided, even if a side face of an energy absorption face is rigid; and therefore, no energy absorption is affected.

(3) A torsional force concentrates on a thin stepped portion, deformation or breakage is likely to occur; and therefore, energy is readily absorbed.

(4) The number of parts can be reduced, leading to cost reduction or a decrease in working process. In addition, quality management is easy.

(5) There is no need to set a slide structure for setting an engagement structure at the time of making dies.

DESCRIPTION OF THE PREFERRED EMBODIMENTS

A cowl-top cover for covering a vehicle body between a front window shield and a front hood is provided with: a seal portion that is in abutment against a rear end lower part of the front hood; and a longitudinal wall portion that supports the seal portion and that is erected in a vertical direction of a vehicle, wherein the longitudinal wall is provided with a stepped portion that is extended along the vertical direction and is shaped to be wavy in a widthwise direction of the vehicle, and further, the longitudinal wall, at a portion that is formed in a forward/backward direction of the wave-shaped wall portion, is defined to be smaller in thickness than another portion, is weighted at a rear end part of the front hood, and is formed to be inclined relative to a lowering direction.

First Embodiment

Hereinafter, one embodiment of the present invention will be described in detail with reference to the accompanying drawings.

Figure 1:
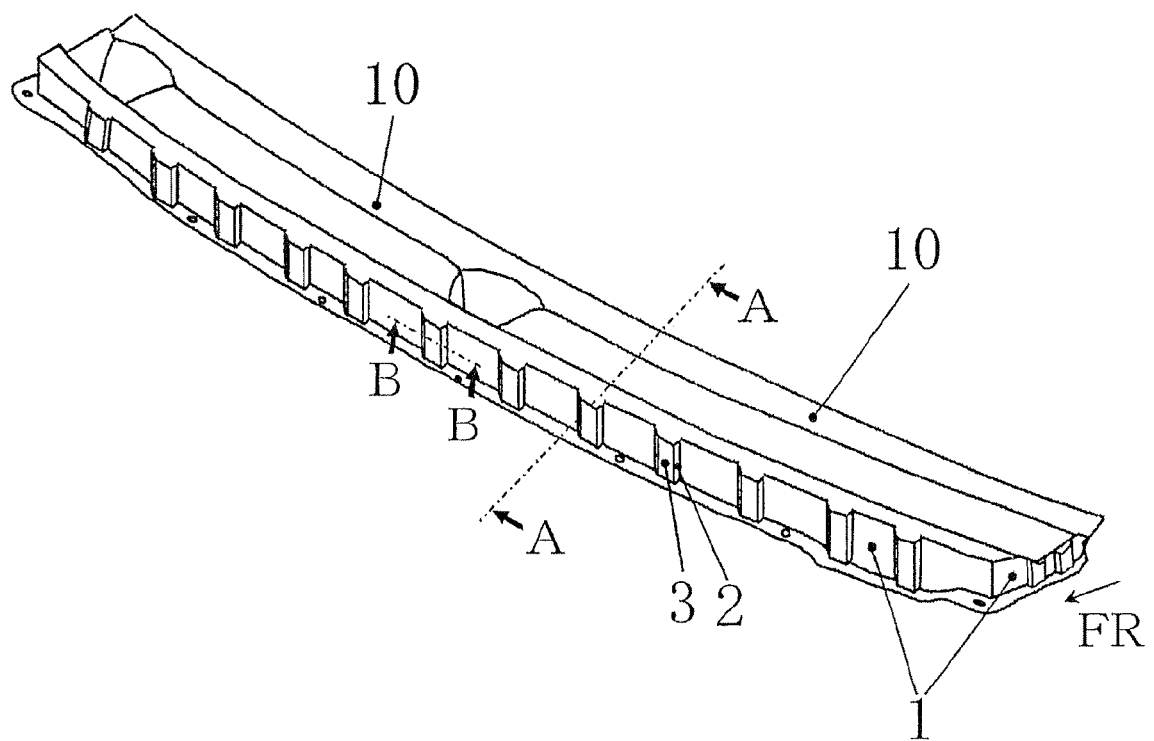
FIG. 1 is a perspective view showing an embodiment of a cowl-top cover of the present invention.

FIG. 1 is a perspective view of a cowl-top cover of the present invention, wherein a thin portion 2 that is small in thickness on a side face is formed, and a stepped shape 3 is formed, on a longitudinal wall portion 1 that is a site for achieving shock absorption. The longitudinal wall portion 1 that is the shock absorption face is provided to set an input angle 5 relative to a shock input direction 4 (refer to FIG. 2). In addition, the side face of the stepped shape 3 formed the thin portion 2 that is formed to be thin relative to a basic plate thickness.

Figure 3:
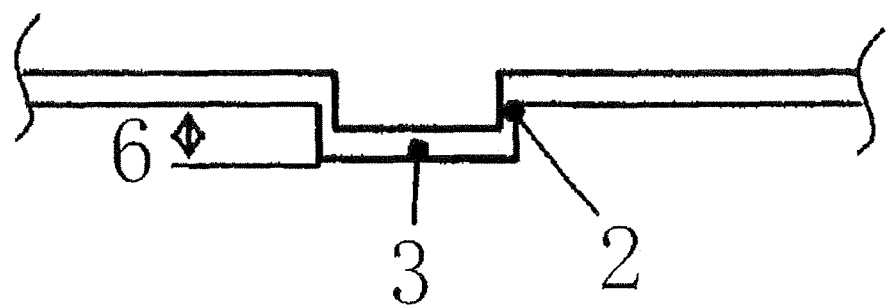
FIG. 3 is a sectional view taken along the line B-B of FIG. 1.

Further, a step height 6 of the stepped shape is provided to be equal to or greater than at least the basic plate thickness (refer to FIG. 3).

By employing such a construction, if a cowl-top cover 10 of the present invention is subject to a shock, a deformation occurs to the stepped shape 3. This impact force propagates in a radial shape 7 relative to an impact point.

Figure 4:
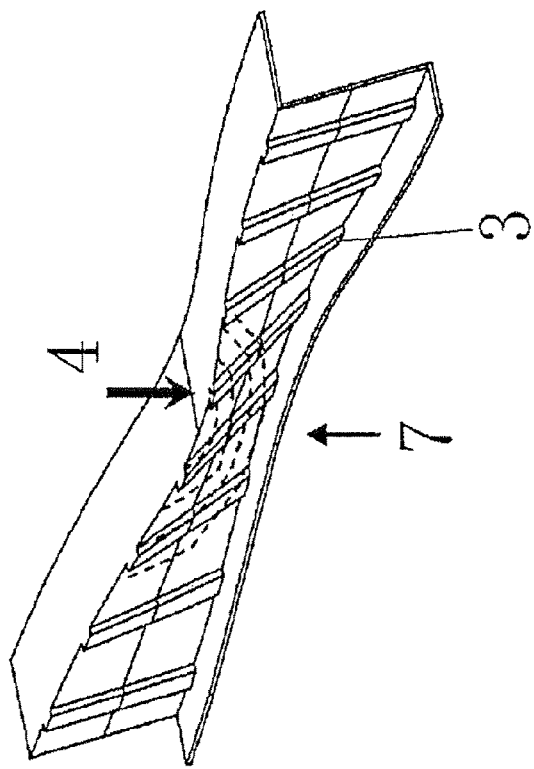
FIG. 4 is a state of shock absorption of the cowl-top cover of the present invention, wherein FIG. 4 (a) is a view of an image showing a state prior to shock absorption, and FIG. 4 (b) is an imaginary view showing a state subsequent to shock absorption.
Figure 4:
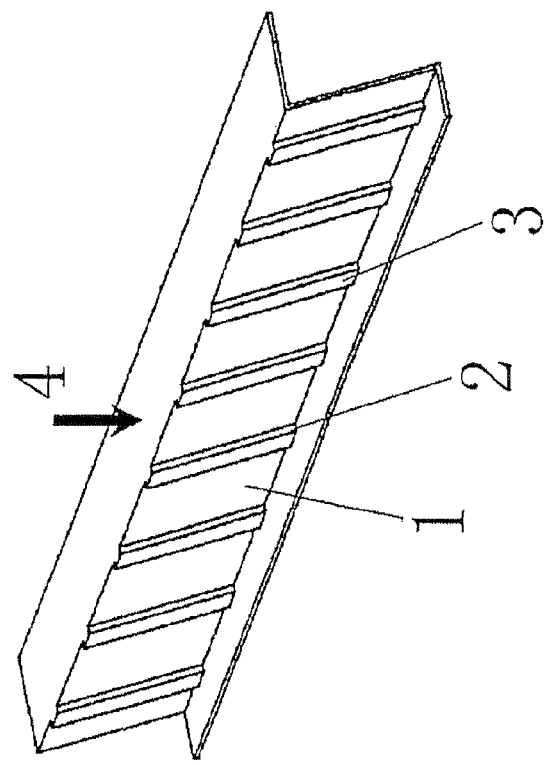

According to the cowl-top cover 10 of the present invention, the impact energy propagating in the radial shape 7 is efficiently crushed by means of the thin portion 2 of the longitudinal wall portion 1 that is provided in the stepped shape 3, thereby achieving absorption of the impact energy in a longitudinal direction as well as that in a vertical direction (refer to FIGS. 4 (a) and 4 (b)).

Next, a description will be given with respect to deformation of the cowl-top cover 10 in a case where an angle of a shock that is applied to the cowl-top cover 10 is substantially perpendicular or in a case where the applied angle is oblique.

Figure 5:
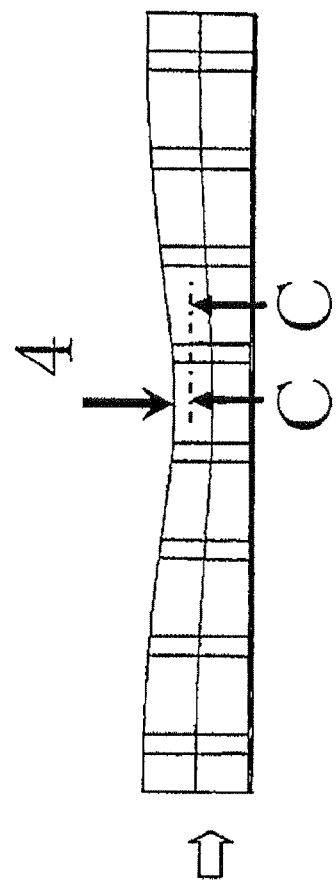
FIG. 5 is a state of shock absorption when an angle-free shock is applied from a top side of the cowl-top cover of the present invention, wherein FIG. 5 (a) is a view of an image showing a state prior to shock absorption, and FIG. 5 (b) is a view of an image showing a state subsequent to shock absorption.
Figure 5:
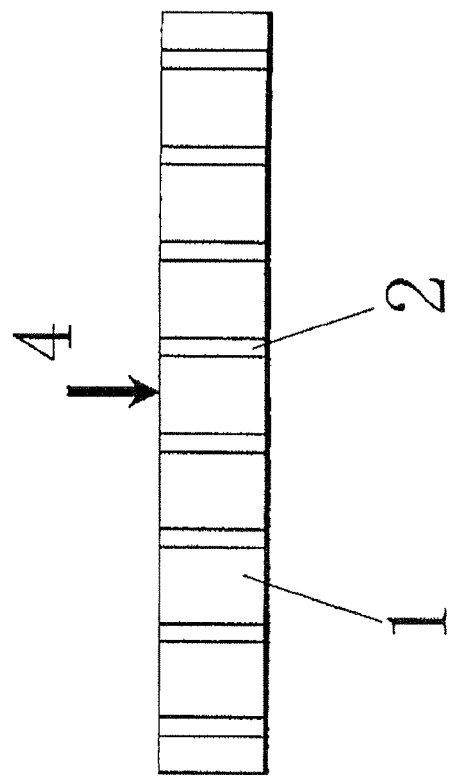
Figure 6:
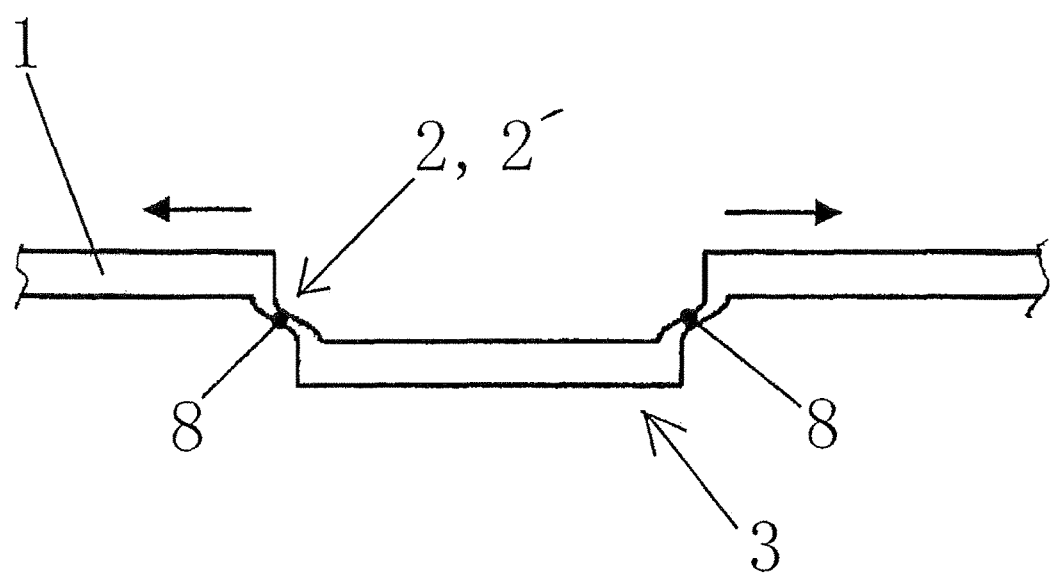
FIG. 6 is a sectional view taken along the line C-C, showing an expansion deformation at the time of shock absorption of FIG. 5.

As can be understood from FIGS. 5 (a) and 5 (b) and FIG. 6, in the case of a shock that is applied in an angle-free substantially perpendicular direction, energy propagates in a radial shape around a point at which the shock is applied. Thus, a deformation (fracture) occurs to a portion in a forward/backward direction of a wall portion that is formed to be smaller in width than another portion of the stepped shape 3 that is provided on the longitudinal wall portion 1 of the cowl-top cover 10, causing an expansion deformation 8, and an effective absorption can be obtained by releasing the impact energy so as to be propagated in the longitudinal direction as well as allowing the impact energy to be crushed in the vertical direction. At this time, a portion 2' that is formed in the forward/backward direction of the wall portion is defined as the thin portion 2, whereby a stress exerted by the shock is concentrated and then a deformation (fracture) is more likely to occur.

Figure 7:
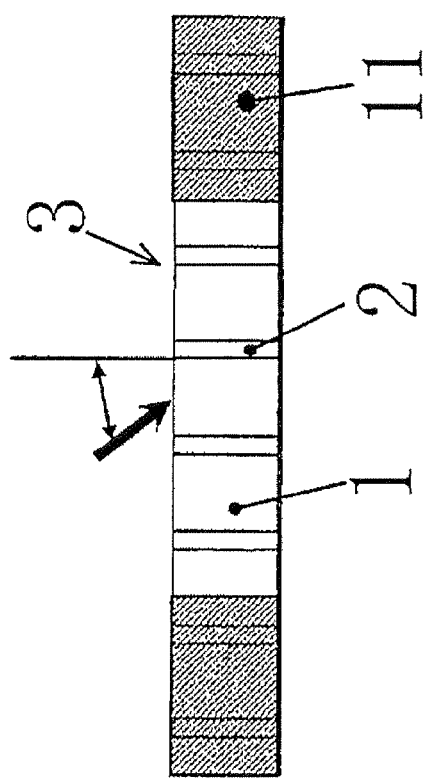
FIG. 7 is a state of shock absorption when an angular shock is applied in a top side of the cowl-top cover of the present invention, wherein FIG. 7 (a) is a view of an image showing a state prior to shock absorption, and FIG. 7 (b) is a view of an image showing a state subsequent to shock absorption.
Figure 8:
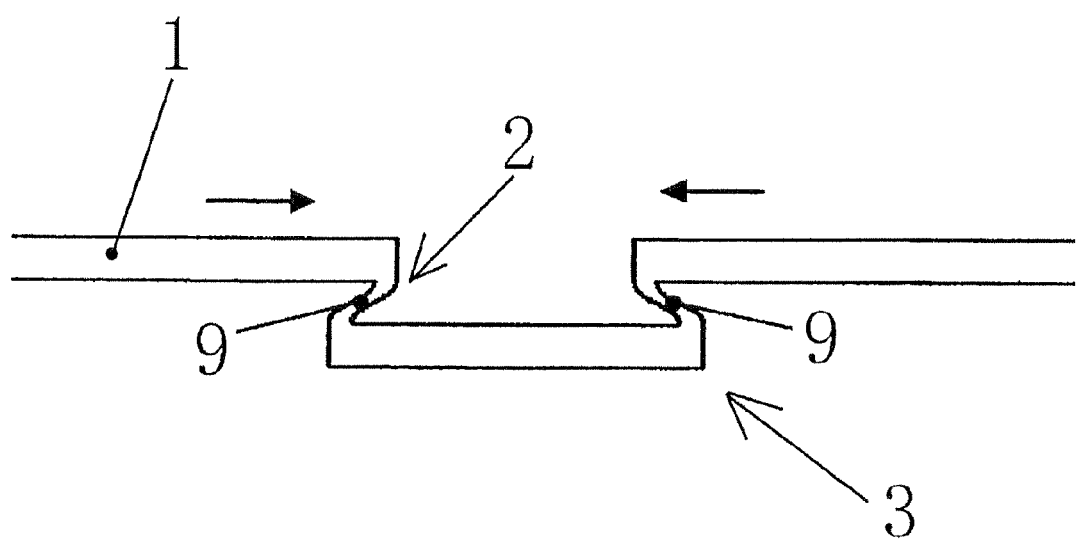
FIG. 8 is a sectional view taken along the line D-D, showing a reduction deformation at the time of shock absorption.

Next, in the case of a shock that is applied in an angled oblique direction, as shown in FIG. 7 (b), at an impact point at which the shock is obliquely applied, a reduction deformation 9 occurs to a face, as shown in FIG. 8, and in a distant location, the expansion deformation 8 is caused to occur, thus achieving efficient absorption of an impact energy.

It is to be noted that at this time also, needless to say, the portion 2' that is formed in the forward/backward direction of the wall portion is defined as the thin portion 2, whereby a stress exerted by a shock is concentrated, and a deformation (fracture) is more likely to occur.

Figure 2:
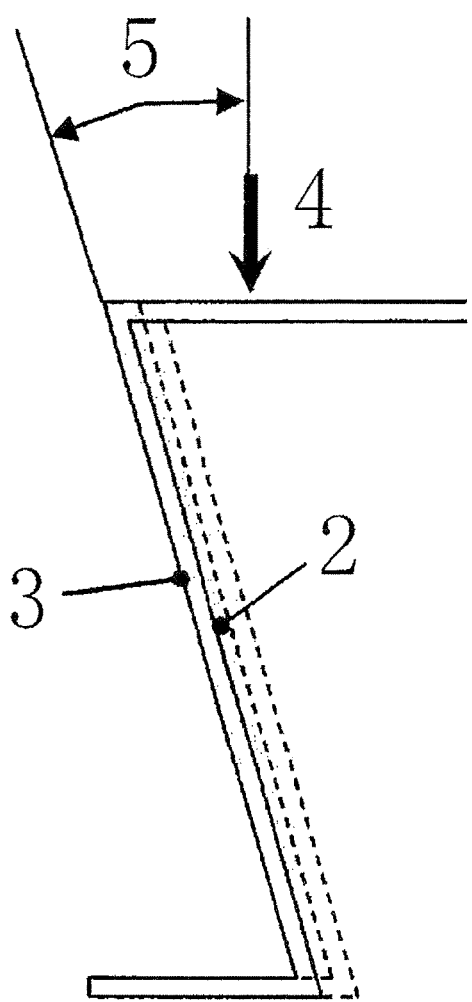
FIG. 2 is a sectional view taken along the line A-A of FIG. 1.

The input angle 5 is set to about 15 degrees in an example of FIG. 2.

If an angle for selecting an angle that is capable of achieving absorption of an impact energy increases while facial reduction deformation and expansion deformation are propagated and released in the longitudinal direction of the cowl-top cover 10 (the transverse direction of the vehicle), an inclined face is subjected to the shock, the impact energy is likely to locally fall down, and as a result, a deformation behavior as shown in FIG. 4 (b) tends to be in a narrow range.

Alternatively, if the angle is reduced, a compression in a vertical direction becomes dominant, there is a tendency that a fall-down deformation is reduced, and as a result, the deformation behavior tends to be in a narrow range. That is, it becomes more critical in thickness of the longitudinal wall of the cowl-top cover 10 or the thin portion 2 of the stepped shape 3 and/or in setting of material characteristics. Therefore, a more workload is required to ensure test verification work for optimization.

In the case of setting the input angle 5, it is possible to comparatively readily obtain the preferred crush propagation characteristics. While an optimal angle is different depending on the thickness of the longitudinal wall of the cowl-top cover 10 or the thin portion 2 of the stepped shape 3 and/or in setting of the material characteristics, the range of approximately 10 degrees to 30 degrees produces good characteristics. Since the cowl-top cover 10 of the present invention employs the construction as described above, even if the longitudinal wall portion 1 that is the shock absorption face communicates with a rigid body 11, a deformation occurs at the time of a shock, and the deformed faces are superimposed on each other in the stepped shape 3, thus making it possible to achieve efficient shock absorption.

Next, another embodiment of the present invention will be described with reference to FIGS. 9 (a) to 9 (d).

Figure 9:
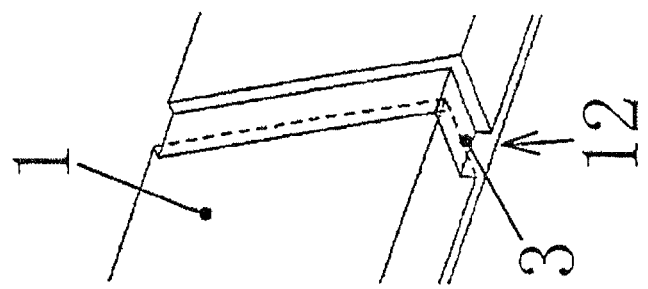
FIG. 9 is an enlarged view of essential portions, showing another embodiment of a shape of a longitudinal wall portion of the cowl-top cover of the present invention.
Figure 9:
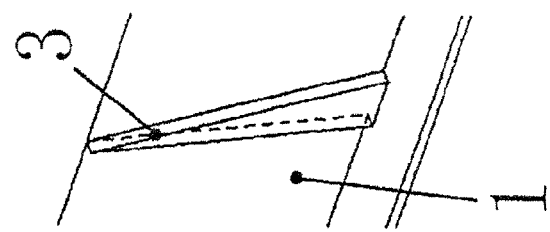
Figure 9:
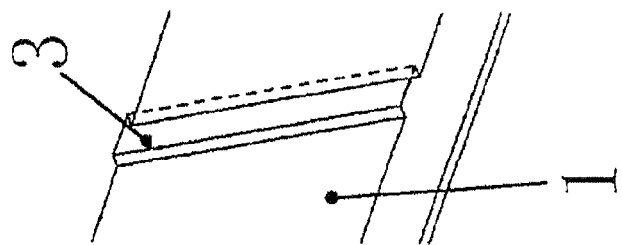
Figure 9:
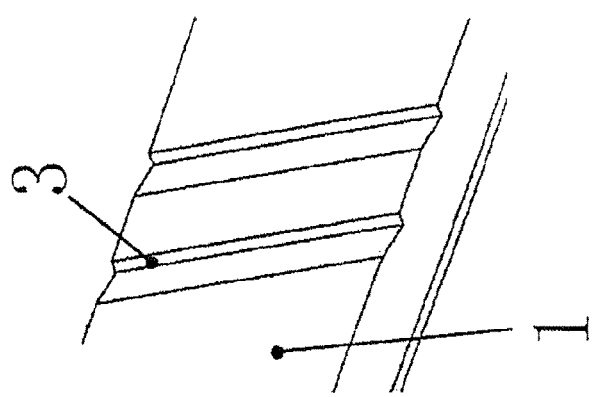

FIG. 9 (a) shows another embodiment of the stepped shape 3 that is provided at the longitudinal wall portion 1 in only one direction, wherein this stepped shape is effective in case of its limited space requirements, has an advantageous effect which is similar to that of the foregoing embodiment, and is capable of achieving efficient absorption of an impact energy.

FIG. 9 (b) also shows another embodiment of the stepped shape 3 that is provided at the longitudinal wall portion 1, the stepped shape being provided in a recessed direction in place of being provided in a protrusive direction, wherein this stepped shape also has an advantageous effect which is similar to that of the foregoing embodiment, and is capable of achieving efficient absorption of an impact energy.

FIG. 9 (c) shows another embodiment of the stepped shape 3 that is provided at the longitudinal wall portion 1, the stepped shape being provided in a triangular shape in place of being provided in parallel to each other, wherein this stepped shape also has an advantageous effect which is similar to that of the foregoing embodiment, and is capable of achieving efficient absorption of an impact energy. This triangular shape may be employed with being limitative thereto, in a variety of shapes such as a reverse-triangular shape.

FIG. 9 (d) shows an another embodiment of the stepped shape 3 that is provided at the longitudinal wall portion 1, the stepped shape being provided on a Z-face 12 of the cowl-top cover 10, wherein the stepped shape also has an advantageous effect which is similar to that of the foregoing embodiment, and is capable of achieving efficient absorption of an impact energy.

Industrial Applicability

A cowl-top cover of the embodiments is applicable to all kinds of vehicles.

What is claimed is:

1. A cowl-top cover for covering a vehicle body, the cowl-top cover comprising:
a longitudinal wall portion that is a shock absorption face provided in a front end of the cowl-top cover and erected in a vertical direction of a vehicle, wherein
the longitudinal wall portion comprising a plurality of stepped portions that extend along the vertical direction,
each stepped portion comprising a top portion and a pair of side portions,
each side portion having a thickness less than a thickness of the top portion, and
the plurality of stepped portions being arranged along a widthwise direction of the vehicle so that the longitudinal wall portion is shaped to be wavy.

2. The cowl-top cover according to claim 1, wherein each stepped portion is smaller in thickness than an adjacent section of the longitudinal wall portion.

3. The cowl-top cover according to claim 2, wherein the longitudinal wall portion is configured to be inclined relative to a lowering direction.

4. The cowl-top cover according to claim 1, wherein the longitudinal wall portion is configured to be inclined relative to a lowering direction.

5. The cowl-top cover according to claim 1, wherein each of the stepped portions of the longitudinal wall portion is provided in a protrusive direction in a forward direction of the vehicle.

6. The cowl-top cover according to claim 1, wherein each of the stepped portions of the longitudinal wall portion is configured to expand and deform in the widthwise direction of the vehicle.

7. The cowl-top cover according to claim 1, wherein the stepped portion of the longitudinal wall portion has a plurality of stepped portions along the widthwise direction of the vehicle, and
the plurality of stepped portions is configured so as to have either a reduction deformation or an expansion deformation depending on an impact position.

8. The cowl-top cover according to claim 1, wherein the longitudinal wall portion is set at an angle within a range of approximately 10 degrees to 30 degrees with respect to a perpendicular line in the vertical direction of the vehicle.

9. The cowl-top cover according to claim 1, wherein the stepped portion extends along the entire vertical direction of the longitudinal wall portion.

10. The cowl-top cover according to claim 1, wherein the stepped portion is adapted to deform from an impact force and propagate the impact force in a radial shape.

11. The cowl-top cover according to claim 1, wherein the cowl-top cover is shaped to cover a vehicle body between a front window shield and a front hood.

* * * * *